(12) United States Patent
Mulligan

(10) Patent No.: US 8,640,721 B2
(45) Date of Patent: Feb. 4, 2014

(54) CONVERTIBLE MOBILE HUNTING BLIND

(76) Inventor: Patrick Mulligan, North Little Rock, AR (US)

( * ) Notice: Subject to any disclaimer, the term of this patent is extended or adjusted under 35 U.S.C. 154(b) by 11 days.

(21) Appl. No.: 13/400,875

(22) Filed: Feb. 21, 2012

(65) Prior Publication Data

US 2012/0211043 A1 Aug. 23, 2012

Related U.S. Application Data

(60) Provisional application No. 61/463,625, filed on Feb. 22, 2011.

(51) Int. Cl.
*E04H 15/58* (2006.01)

(52) U.S. Cl.
USPC ............. 135/117; 135/90; 135/901; 160/350; 160/351; 160/349.1; 160/368.1

(58) Field of Classification Search
USPC ............ 135/143, 117, 90, 901; 160/350, 351, 160/349.1, 352, 368.1, 368.2; 40/617, 604, 40/603
See application file for complete search history.

(56) References Cited

U.S. PATENT DOCUMENTS

| | | | | |
|---|---|---|---|---|
| 1,466,166 A * | 8/1923 | Hodgson | ............................. | 2/89 |
| 2,067,487 A * | 1/1937 | Gluckman | ...................... | 24/514 |
| 3,032,046 A * | 5/1962 | Coonradt | ........................ | 135/90 |
| 4,375,134 A * | 3/1983 | Sheetz | .............................. | 40/591 |
| 5,033,528 A * | 7/1991 | Volcani | ........................ | 160/351 |
| 5,333,665 A * | 8/1994 | Safar | .......................... | 160/84.05 |
| 5,937,881 A * | 8/1999 | Villa | ............................ | 135/20.1 |
| 6,173,725 B1 * | 1/2001 | Garth | ............................. | 135/87 |
| 6,357,710 B1 * | 3/2002 | Fielden et al. | ............. | 248/276.1 |
| 6,434,877 B1 * | 8/2002 | Shelton | ............................. | 43/1 |
| 6,565,052 B1 * | 5/2003 | Doublet | ........................ | 248/218.4 |
| 7,182,091 B2 * | 2/2007 | Maddox | ......................... | 135/90 |
| 7,585,020 B1 * | 9/2009 | Wahl, Jr. | ................. | 297/184.15 |
| 8,122,629 B2 * | 2/2012 | Cowgill | .......................... | 40/610 |
| 8,157,394 B1 * | 4/2012 | Downing | ........................ | 359/868 |
| 2007/0144569 A1 * | 6/2007 | Fereghetti et al. | ............. | 135/90 |
| 2009/0139124 A1 * | 6/2009 | Cowgill | .......................... | 40/610 |
| 2013/0019912 A1 * | 1/2013 | Kennedy et al. | ................ | 135/16 |

* cited by examiner

*Primary Examiner* — Noah Chandler Hawk
(74) *Attorney, Agent, or Firm* — Stephen D. Carver

(57) ABSTRACT

A portable hunting blind employs a hand-operated, spring biased clamp with a pair of compressible handles that open spring-biased clamping jaws. The clamping jaws include internal grooves for sure gripping. An elongated, bendable arm extends from one of the clamp handles. An attachment juncture formed in one of the handle ends secures the arm to the clamp. The flexible metal arm can be configured by bending as desired by a hunter to assume a desired shape. A camouflage curtain is secured to the arm, which supports it like a flag pole. When an area for deployment is reached, the clamp is affixed to an available object, such as a tree limb, support the curtain and camouflage a limited selected area. The shape of the concealed arm can be varied by bending the arm. The curtain bottom may be secured to a convenient object to prevent movement.

2 Claims, 5 Drawing Sheets

CONVERTIBLE MOBILE HUNTING BLIND

CROSS REFERENCE TO RELATED APPLICATION

This utility application is based upon, and claims priority from prior U.S. provisional application entitled "Convertible Hunting Blind", application Ser. No. 61/463,625, filed Feb. 22, 2011 by inventor Patrick Mulligan.

BACKGROUND OF THE INVENTION

I. Field of the Invention

The present invention relates generally to portable hunting blinds. More particularly, the present invention relates to portable, lightweight, hands-free hunting blinds that a hunter conveniently carry and then can deploy immediately to quickly provide a weapon-mounted, ground-mounted or tree-installed blind that adapts to multiple hunting situations.

II. Description of the Prior Art

As is well recognized by those skilled in the art, hunting blinds that properly conceal or camouflage increase the hunter's success. Some blinds are heavy and bulky, and require excessive effort to transport. Many are difficult to erect, particularly in the near darkness of early morning. Stationary hunting blinds take time to assemble and disassemble, and they are time consuming and challenging to transport. Hunting blinds are bulky and need to be assembled or unpacked in the field. They cannot be moved quickly from location to location and can't be used in all terrains or hunting situation. Conventional blinds can hinder the hunter's ability to carry needed items in the woods because the hunter has to carry the blind with a hand or over his shoulder. They cannot be used in all hunting conditions or terrain because of their bulk and weight. A blind must be lightweight and "hands free" to carry.

SUMMARY OF THE INVENTION

My invention is a portable hunting blind. The blind is user configurable in the field to assume a variety of shapes and concealment configurations.

The blind is supported by a hand-operated, spring biased clamp comprising a pair of handles that can be compressed together to open the clamp jaws. The clamp jaws preferably include internal grooves for gripping. An elongated, bendable, arm extends from one of the clamp handles. An attachment juncture formed in one of the handle ends secures the arm to the clamp.

The flexible arm is preferably made of metal cable. The arm can be configured by bending as desired by a hunter to assume a desired shape. The cable preferably comprises metal, but may be made from a variety of materials. A camouflage curtain is secured to the arm, which supports it like a flag pole. When an area for deployment is reached, the clamp is affixed to an available object, such as a tree limb, to support the curtain. Preferably the curtain includes means at its bottom, such as a flexible wire, for securing the curtain where movement is not desired.

The blind is mobile and can be used anywhere. It is portable hands free for stalking game. It can also be used year round, not just for hunting. It is a hands free, light weight, portable hunting blind that attaches to most anything and can be used to aid the hunter in concealing himself, while moving, from his or her vehicle, to a hunting stand or placement. It can then be used as a stationary stand, in a conventional tree-mounted stand, on the ground, or on the water while duck hunting. The hunting blind can be moved with out disassembling it from one hunting location to another, by the hunter, without wasting time or effort. No extra carrying bag is required.

Thus my portable blind allows the hunter to remain concealed and move to stalk game in open or wooded areas. It requires no assembly in the field and can be used almost immediately as a portable blind (stalk hunting) or stationary blind. This blind provides concealment the whole time the hunter is hunting. The blind also has multiple other functions not related to just hunting and can be used year round.

It requires no assembly or disassembly by the hunter. The hunting blind can be used to conceal the hunter as a hands free portable blind, while the hunter stalk hunts in any terrain or conditions. It can also be used as a stationary hunting blind in any conditions. The hunter wastes no time from using the blind stalking game to simply switching it to a stationary hunting blind in a tree, on the ground or in the water duck hunting. It can provide concealment to a hunter from his first step into the outdoors until his last step leaving the outdoors.

Thus a basic object of my invention is to provide a lightweight, portable hunting blind.

A related object is to provide a blind of the character described that is adaptable to a variety of hunting environments.

Another important object is to provide a portable blind that can be easily carried and deployed by a hunter.

It is also an object to provide a portable blind of reduced size and bulk that can be used in a variety of hunting locations, and which can be used to provide supplementary camouflage effects in permanent blinds or large, fixed tree stands.

Another object is to provide a portable hunting blind of the character described.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION

Figure 1:
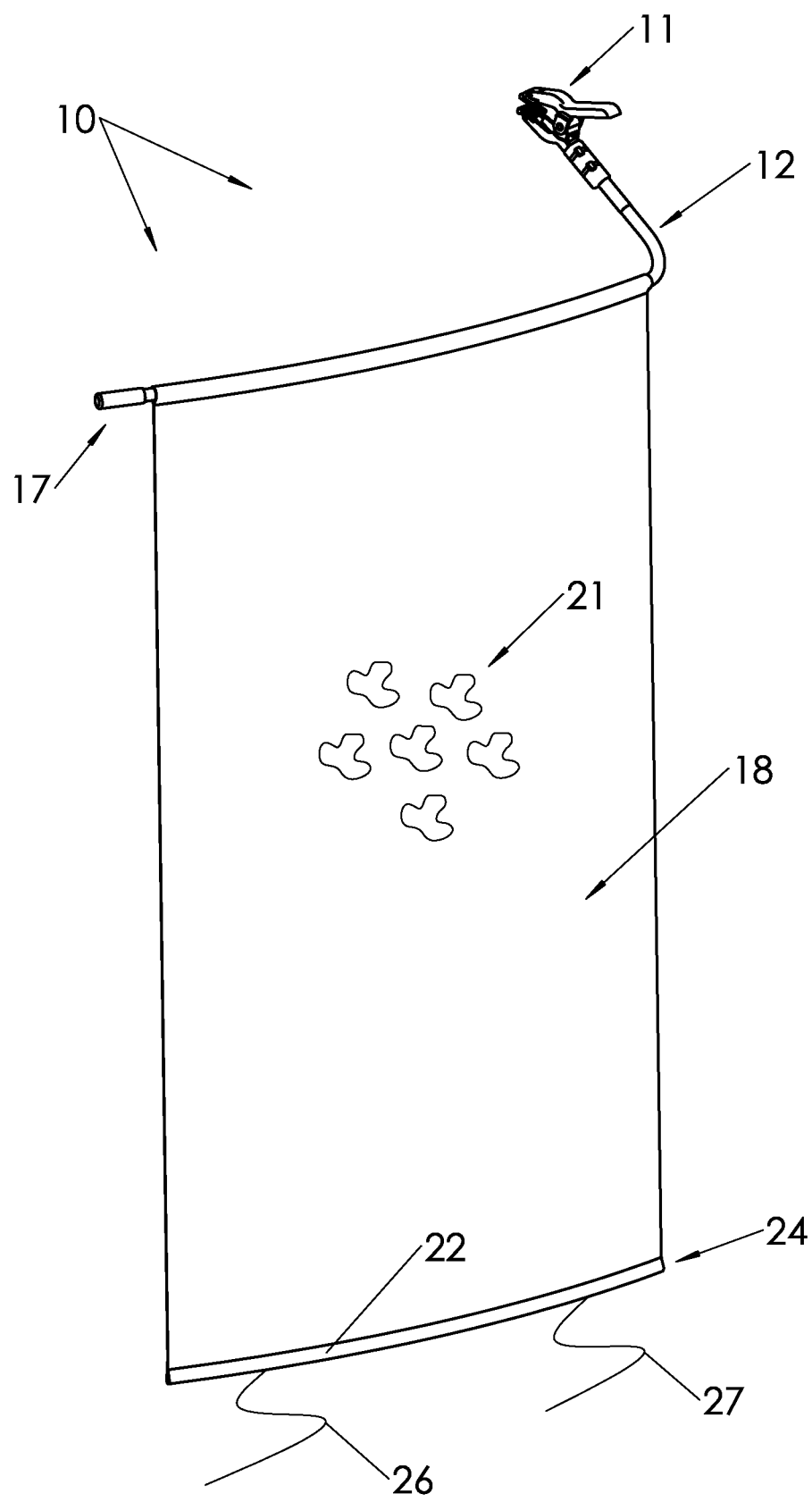
FIG. 1 is a frontal isometric view of my new hunting blind, showing the arm in a possible bent configuration.

With initial reference directed to FIG. 1 of the appended drawings, a portable hunting blind constructed in accordance with the best mode of the invention has been designated by the reference numeral 10. Blind 10 comprises a clamp 11 configured and designed to support the blind when deployed as desired from or upon a desired object or support.

The clamp 11 supports an elongated, bendable arm 12 preferably made of flexible cable. Arm 12 is configured and designed to conform to a desired shape, configured by bending. The arm 12 is preferably made of aluminum and/or other metals that are or twisted together and wrapped in a rubber or plastic coating. The arm 12 preferably could be made of any metal or mixture of metals and rubber or plastic. Arm 12 is designed to preferably rotate or be moved into any shape.

Figure 3:
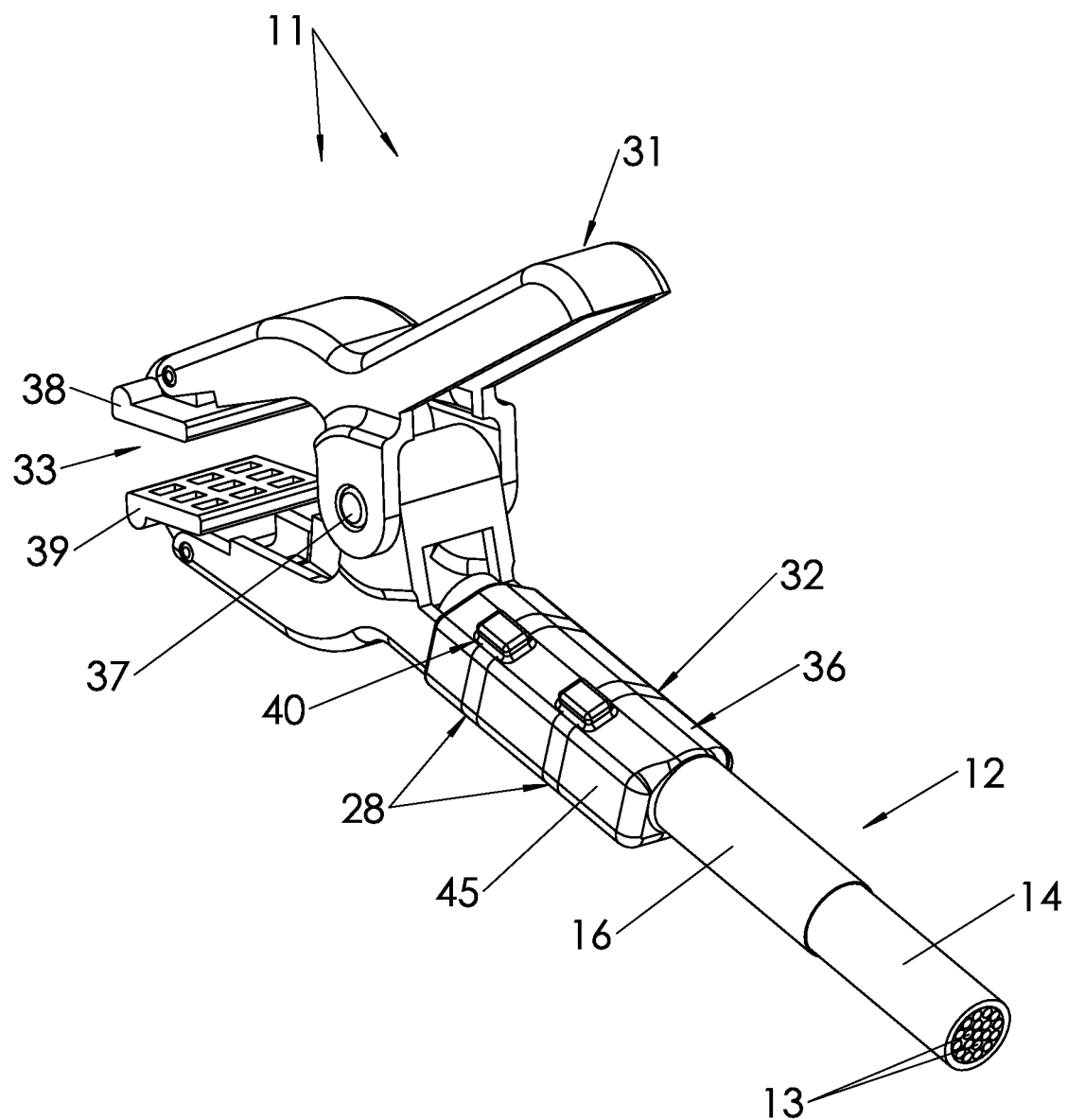
FIG. 3 is an enlarged, fragmentary isomeric view of the preferred clamp.

As seen in FIG. 3, the preferred arm 12 comprises a plurality of separate metallic strands 13 shrouded by a conventional insulative sheath or covering 14. The terminal arm end is connected to the clamp 11 (i.e., FIG. 3) is preferably covered in tubular heat shrink 16 that also coves a portion of the clamp handle. The opposite outer end 17 of arm 12 is preferably free to allow maximum dexterity and freedom in bending and configuring the arm 12. However, arm end 17 can be provided with accessory items such as hooks or clamps for manipulating it, and perhaps series connecting a number of blinds 10 together. The length of arm 12 is preferably (but not necessarily) between two and six feet in length, and more preferably about three feet in length. It is preferably one-eighth to one inch thick in diameter.

Arm 12 supports a camouflage curtain 18. The preferably rectangular, cloth curtain 18 is approximately two to four feet long. The camouflage curtain 18 can be affixed and attached to the entire length of the arm 12 like a flag pole. Preferably the cloth curtain 18 has a tubular loop 19 and its upper end that is penetrated by the arm 12. A lower, looped end comprises an additional loop 22 that can house an additional lower brace 24 (FIG. 4) and a pair of wires or laces or wires 26, 27 used for tying the curtain 18 or fixing it in place. A variety of miscellaneous camouflage and/or colored patterns 21 may be displayed on the curtain 18. For different hunting environments, the curtain may be changed to display appropriate coloration or patterns that blend in with the environment.

Figure 4:
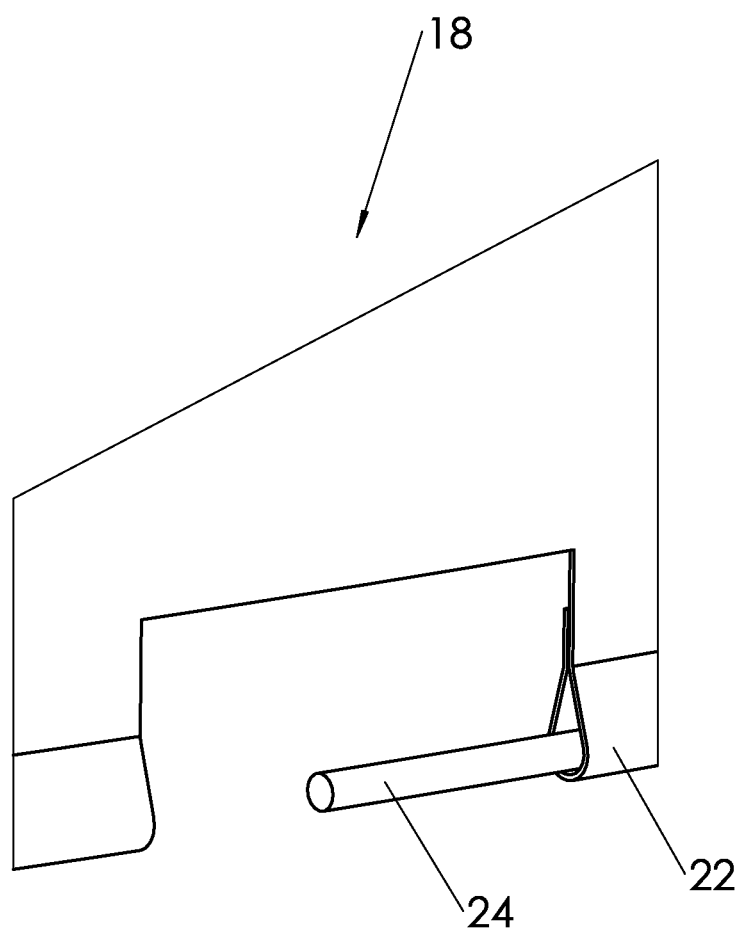
FIG. 4 is an enlarged, fragmentary isometric view of a portion of the lower curtain, with portions thereof shown in section for clarity; and, FIG. 5 is an isometric view of the blind showing it deployed from a tree limb.

Referencing FIGS. 1 and 4, loop 19 enables the camouflage curtain 18 to be configured like a conventional curtain that fits over a curtain rod. It is then slid over the opposite end of the arm 12 covering the length the arm length. Any known connecting materials, metal, adhesive, etc. may be used in attaching one or all of the parts of this blind. As seen in FIG. 4, the lower curtain loop 22 similarly mounts an auxiliary internal lower brace 24 that is flexible or bendable. Brace 24 can be bent to insure proper mounting or shaping to the curtain 18 in use. Brace preferably similar to arm 12 in construction, but preferably it is has diameter less than the diameter of arm 12.

The preferred clamp 11 may comprise a conventional, hand-operated, spring biased clamp comprising handles 31 and 32 that can be hand-manipulated to open compressive jaws 33. The clamp 11 can be comprised of metal or plastic materials. It's form is preferably like a pair of scissors, but can be in any form that allows it to clamp to any object by squeezing the two handles 31, 32 together to open the jaws for gripping an object from which the blind is to be suspended. Handle 31 is biased shut by an internal spring (not shown) that pivots it over rotational axis 37. The clamp preferably has teeth-like or frictional gripping pads 38, 39 defined within its jaws 33. It's preferred size is such that the clamp can open up to attach to objects between two to six inches thick. The clamp is preferably (but not necessarily) between two to ten inches in length and is big enough to attach to an object that is two to four inches wide.

The clamp 11 has an attachment junction, generally indicated by the reference numeral 28 (FIG. 3) that accepts connection to the arm 12. Handle end 32 opposite jaws 33 has a tubular portion 36 preferably formed as one piece in the handle that will coaxially receive the end of arm 12 (FIG. 3). Preferably the arm 12 screws into the clamp handle 32, but other fastening arrangements are possible. In FIG. 3 arm 12 is connected to the clamp 11 by zip ties 40 and adhesive tape 45. Any connectors may be used, including screws, bolts, adhesives, etc. Zip ties 40 can be used for fastening the arm 12 to the clamp 11. Alternatively, a male end defined in one of the clamp handles 31 or 32 can secure the arm 12.

A metal hook could be added to the opposite end of the clamp. The cable is strong enough to hang a deer from a tree or to drag a deer with.

Figure 2:
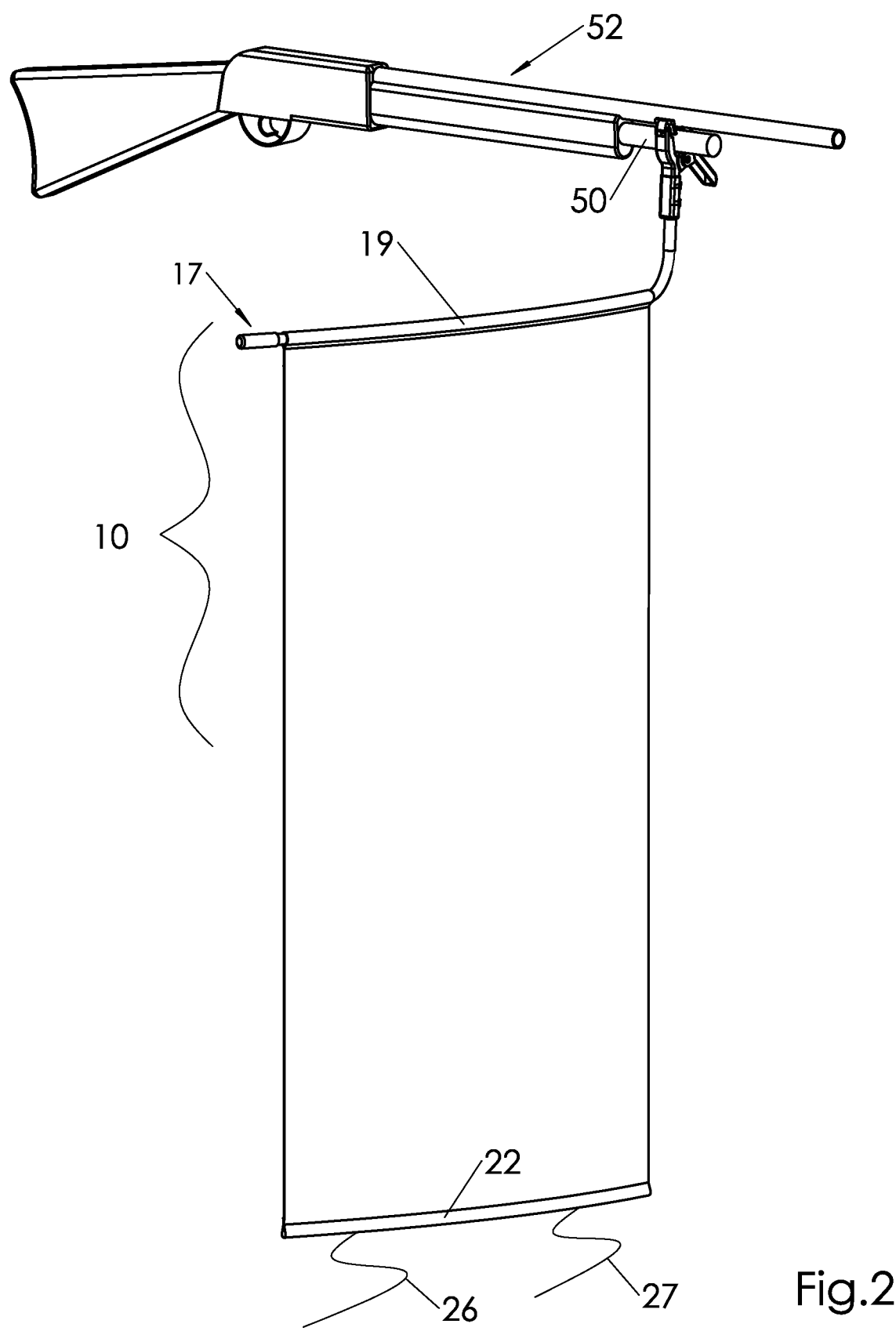
FIG. 2 is a frontal isometric view similar to FIG. 1, but showing the blind attaché to a rifle.

Hunting blind 10 is lightweight and portable. It comes to the hunter assembled. All he has to do is stick it in his fanny pack/backpack, wrap it around his neck, clamp it onto his climbing stand or four-wheeler and carry it into the woods. If the hunter wants to use it to conceal himself while stalk hunting or walking to his hunting area all he has to do is attach the clamp 11 to a portion 50 of his firearm 52 (FIG. 2). The arm 12 and brace 24 hold any desired shape. This creates a portable blind that covers the hunter as he walks. The hunter could also just hold the clamp 11 in one hand, shape the arm 12 and hold the blind out in front of him to conceal his movements. He could at any time stop (if he saw a deer/turkey) and with little movement or effort attach the clamp 11 to his gun, around a tree, on a bush, on a limb etc. Then the hunter would quickly shape the arm 12 and brace 24 and let the camouflage curtain 18 conceal him by creating an instant ground blind.

Figure 5:
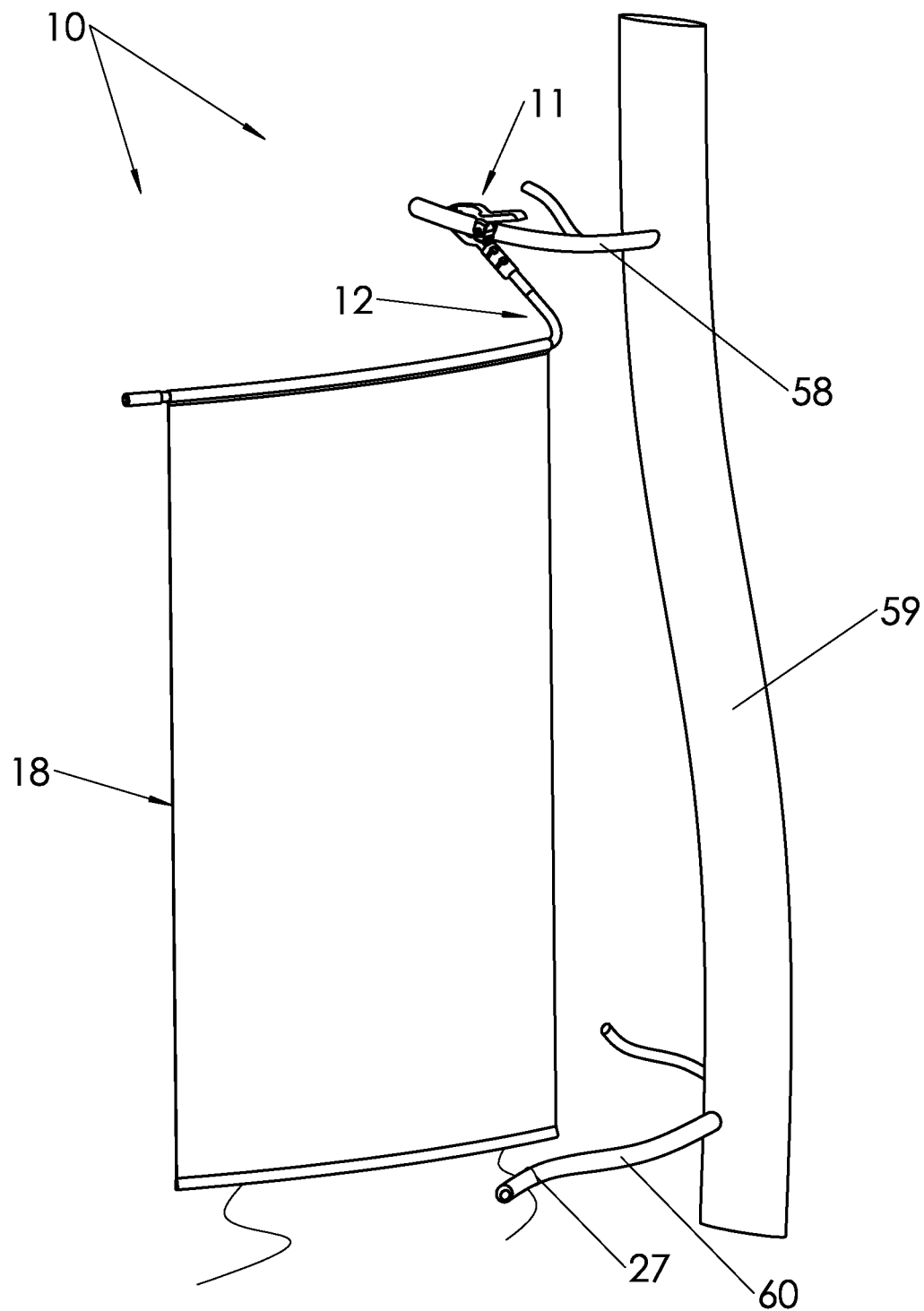

The arm 12 is so flexible and maintains it's form that it can be attached by the clamp 11 to a convenient limb 58 or around a tree 59 (FIG. 5). A lower wire 27 can be affixed to an available lower limb 60 to conceal the hunter.

Blind 10 can be used in a climbing stand or box stand that has little cover. Just attach clamp 11 to your stand, climb tree, shape the arm 12 and let the camouflage material/curtain out. It will conceal the hunter. It can also be clamped to branches near your tree stand instead of your stand to cover the open areas around your tree stand. If it starts to rain, the blind can be clamped on a tree stand and shaped in the form of a suitable cover or roof. The hunter then could use the camouflaged curtain 18 as an umbrella. If the hunter was walking in the rain, the hunter only has to wrap the arm 12 over his shoulders and use the clamp 11 to secure the cable, then use waterproof camouflage curtain 18 as a rain jacket. This blind can thus be used in a variety of situations, and its size and portability facilitates use while stalking prey.

A user can use the blind to help conceal him while hunting all game animals in any condition or terrain. This hunting blind can be used while stalking game or be used as a stationary blind. It can be used in a tree stand or a box stand to create a blind or provide more concealment. It can be used as an umbrella or rain jacket. It can attach to most anything and be used as a four wheeler cover or a tree climbing stand cover. It can be used as a portable bathroom. Just clamp it to a tree branch, or bush and shape the cable. Then pull camouflage curtain cover out over the cable and step behind for privacy.

A birdwatcher or photographer could use a portable blind to take photos of animals. A fishermen fishing for shallow fish or sight fishing could attach blind to front of his boat, shape the cable and using a sky patterned camouflage curtain kneel behind and be concealed as he cast for fish. A duck hunter in flooded timber could clamp the blind to the stock of his gun, shape the cable and hide behind the camouflage curtain, or wrap it around the tree adjust the cable and be concealed behind the camouflage curtain. The cable is strong enough to drag a deer or hang a deer from a tree.

In FIGS. 1, 2 and 5 the blind is seen bent to a curved shape. In FIG. 5 it is seen deployed upon a tree branch. The clamp jaws 33 encircle and grasp the branch 58 (FIG. 5). The curtain 18 will deploy down from the arm 12, hanging like a flag. When the cable is bent or zigzagged, the flexible fabric curtain will of course be conformed to approximately the same shape. In this manner irregular items may be covered and concealed.

Thus this hunting blind, but it can be used as an umbrella, a rain jacket, a four-wheeler cover, as a curtain to conceal some one using the bathroom outdoors. It could be used to conceal fishermen that sight fish in shallow water. It can just attach to front of boat, shape cable and us a skyline patterned curtain on the cable to conceal themselves from the fish. The cable is strong enough to use as temporary tie downs on trailers, it can be used as a four wheeler cover, grill or lawn mower covers. Just clamp on and use the waterproof curtain on the cable to cover these items from the elements.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations.

As many possible embodiments may be made of the invention without departing from the scope thereof, it is to be understood that all matter herein set forth or shown in the accompanying drawings is to be interpreted as illustrative and not in a limiting sense.

What is claimed is:

1. A portable lightweight, hands-free hunting blind, the blind comprising:
    a hand-operated clamp adapted to be selectively attached to a desired supporting structure for deploying the blind, the clamp comprising a pair of handles that can be compressed together to open the clamp, and jaws for gripping said supporting structure when said handles are released;
    an elongated, flexible arm comprising a single integral bendable piece extending from the clamp, the arm adapted to be bent by the user into a desired shape to adapt the blind to multiple hunting situations, and said arm is connected to one of said handles;
    a flexible curtain having a top and bottom, the curtain secured at its top to said arm, wherein the curtain comprises at least one tubular loop that is penetrated by the arm, and at least one lower lace at said bottom for fixing the curtain in place; and
    an attachment juncture formed in one of the handle ends to secure the arm to the clamp.

2. The hunting blind as defined in claim 1 wherein the arm is made of flexible cable configured and designed to conform to a desired shape by bending.

* * * * *